(12) United States Patent
Ojha et al.

(10) Patent No.: US 8,977,372 B2
(45) Date of Patent: Mar. 10, 2015

(54) SYSTEM AND METHOD FOR CYCLE TIME VISUALIZATION

(75) Inventors: Pradyumna Ojha, Hyderabad (IN); Abhik Banerjee, Hyderabad (IN); John Alexander Petzen, III, Roanoke, VA (US); William Kennedy Galt, Rustburg, VA (US); Andre Steven DeMaurice, Salem, VA (US); Guruprasad Karkala Vishwanath, Hyderabad (IN)

(73) Assignee: General Electric Company, Schenectady, NY (US)

( * ) Notice: Subject to any disclaimer, the term of this patent is extended or adjusted under 35 U.S.C. 154(b) by 550 days.

(21) Appl. No.: 13/106,741

(22) Filed: May 12, 2011

(65) Prior Publication Data

US 2012/0290114 A1 Nov. 15, 2012

(51) Int. Cl.
*G05B 11/01* (2006.01)
*H04B 7/212* (2006.01)
*G05B 19/418* (2006.01)

(52) U.S. Cl.
CPC ...... *G05B 19/41865* (2013.01); *G05B 2219/32252* (2013.01)
USPC .............................. 700/15; 370/442; 370/230

(58) Field of Classification Search
None
See application file for complete search history.

(56) References Cited

U.S. PATENT DOCUMENTS

| | | | |
|---|---|---|---|
| 6,076,952 A * | 6/2000 | Gretta et al. | 700/83 |
| 6,915,364 B1 | 7/2005 | Christensen et al. | |
| 7,146,230 B2 | 12/2006 | Glanzer et al. | |
| 7,272,457 B2 | 9/2007 | Glanzer et al. | |
| 7,594,226 B2 | 9/2009 | Stelzer et al. | |
| 2003/0004987 A1 | 1/2003 | Glanzer et al. | |
| 2006/0037008 A1 | 2/2006 | Stelzer et al. | |
| 2006/0206218 A1 | 9/2006 | Glanzer et al. | |
| 2007/0129820 A1 | 6/2007 | Glanzer et al. | |
| 2008/0004727 A1 | 1/2008 | Glanzer et al. | |
| 2008/0082193 A1 * | 4/2008 | Enver et al. | 700/100 |
| 2008/0249641 A1 * | 10/2008 | Enver et al. | 700/9 |
| 2009/0319815 A1 * | 12/2009 | Vrancic et al. | 713/400 |
| 2010/0275148 A1 * | 10/2010 | Pan et al. | 715/771 |

FOREIGN PATENT DOCUMENTS

WO 03019304 A1 3/2003

\* cited by examiner

*Primary Examiner* — Sean Shechtman

(74) *Attorney, Agent, or Firm* — Fletcher Yoder, P.C.

(57) ABSTRACT

The embodiments described herein include a system and a method. In one embodiment, an industrial process control system includes a processor and a link active scheduler. The link active scheduler is configured to schedule execution of a macrocycle. The macrocycle includes an application timeslot and an asynchronous timeslot. The link active scheduler is further configured to schedule execution of scheduled instructions for a plurality of field devices of the industrial process control system in the application timeslot. The link active scheduler is further configured to schedule execution of unscheduled instructions for the plurality of field devices of the industrial process control system in the asynchronous timeslot. The industrial process control system further includes a macrocycle viewer executable by the processor. The macrocycle viewer is configured to display the macrocycle in a visual format.

21 Claims, 7 Drawing Sheets

SYSTEM AND METHOD FOR CYCLE TIME VISUALIZATION

BACKGROUND OF THE INVENTION

The subject matter disclosed herein relates to visual presentation of information, and more specifically, to visualization of cycle times.

Certain systems, such as industrial control systems, may provide for control capabilities that enable the execution of computer instructions in various types of devices, such as sensors, pumps, valves, and the like. For example, a communications bus may be used to send and receive signals cyclically to the various devices in order to synchronize the execution of computer instructions. However, the communications bus may communicate with various types of devices from different manufacturers. Accordingly, configuring and/or programming these multiple devices may be complex and time consuming.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, an industrial process control system includes a processor and a link active scheduler. The link active scheduler is configured to schedule execution of a macrocycle. The macrocycle includes an application timeslot and an asynchronous timeslot. The link active scheduler is further configured to schedule execution of scheduled instructions for a plurality of field devices of the industrial process control system in the application timeslot. The link active scheduler is further configured to schedule execution of unscheduled instructions for the plurality of field devices of the industrial process control system in the asynchronous timeslot. The industrial process control system further includes a macrocycle viewer executable by the processor. The macrocycle viewer is configured to display the macrocycle in a visual format.

In a second embodiment, a method includes providing, by a processor of a computer, a visual representation of a macrocycle of an industrial process control system. The macrocycle includes an application timeslot and an asynchronous timeslot. A link active scheduler is configured to schedule execution of at least one function block during the application timeslot, and to schedule execution of unscheduled instructions in the asynchronous timeslot. The method further includes displaying the visual representation on a display of the computer.

In a third embodiment, a non-transitory tangible computer-readable medium including executable code is provided. The code includes instructions for displaying a process control system macrocycle in a visual format, wherein the process control system macrocycle comprises an application timeslot and an asynchronous timeslot. Scheduled instructions are configured execute during the application timeslot and unscheduled instructions are configured to execute during the asynchronous timeslot.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
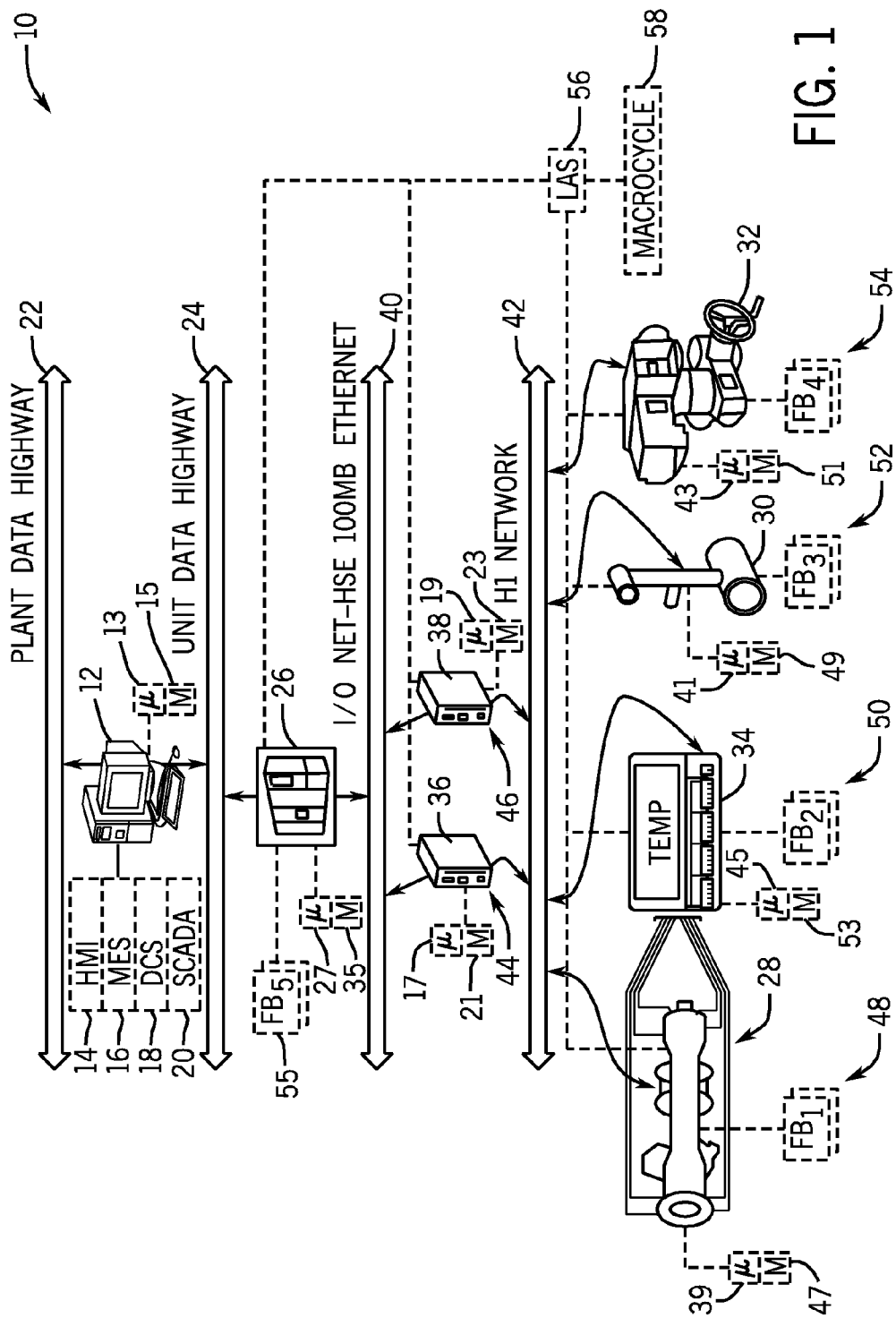
FIG. 1 is a schematic diagram of an embodiment of an industrial control system, including a communications bus.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Industrial automation systems may include controller systems suitable for interfacing with a variety of field devices, such as sensors, pumps, valves, and the like. For example, sensors may provide inputs to the controller system, and the controller system may then derive certain actions in response to the inputs, such as actuating the valves, driving the pumps, and so on. In certain controller systems, such as the Mark VIe controller system, available from General Electric Co., of Schenectady, N.Y., multiple devices may be communicatively coupled to and controlled by a controller. Indeed, multiple controllers may be controlling multiple field devices, as described in more detail with respect to FIG. 1 below. The devices communicatively connected to the controller may include field devices, such as Fieldbus Foundation™ devices, that include support for the Foundation H1 bi-directional communications protocol. Accordingly, the devices may be communicatively connected with the controller in various communication segments, such as H1 segments, attached to linking devices, to enable a plant-wide network of devices.

One or more types of macrocycles, or periodic time cycles, may be provided, during which computer instructions, including application instructions, communications instructions, synchronization instructions, and the like, may be executed. For example, a segment macrocycle may be allocated certain execution time during which computer instructions may execute one or more programs related to the field devices in the segment. A cross-segment or multiple segment macrocycle may also be provided and used to synchronize field devices across segments attached to a linking device. For example, during such a macrocycle, applications may execute and issue commands to the field devices attached to multiple segments in the linking device, such as commands suitable for setting a valve in a desired position (e.g., fully open, partially open, fully closed), commands for deriving decisions based on sensor inputs, and more generally, commands useful in executing a control logic. Communications time may also be used which may be useful in executing commands that enable interactions (e.g., input and output) with the devices in the segment. Likewise, a cross-linking device macrocycle may be provided that includes operations across multiple linking devices. All macrocycle types (e.g., segment macrocycle, cross-segment macrocycle, cross-linking device macrocycle) may further include computer instructions related to the controller. Indeed, the macrocycle may advantageously combine and synchronize computer instructions or control logic included in the controller, with computer instructions or control logic included in the field devices. In this way, the various types of macrocycles may enable an improved execution of computer instructions in a segment, across multiple segments, and across multiple linking devices.

In one embodiment, a link active scheduler (LAS) may be used to schedule the execution of the macrocycles. The LAS may be disposed in a linking device or in a field device, or both. Indeed, more than one LAS may be used, with a first LAS acting as a master scheduler, while a second and any additional LAS's acting as backup schedulers. In the case of failure of the master LAS, the multiple backup LAS's may then vote on a new master LAS, which may then be used to schedule the macrocycle. It may be beneficial to visualize the various types of macrocycles that may be scheduled by the LAS, for example, to improve programming of the field devices in the macrocycle, as well as to optimize configuration of the field devices, the linking devices, and the controller. For example, a visualization of the macrocycles may identify unused application time suitable for adding extra control logic. Likewise, the visualization may identify areas amenable to reprogramming certain logic to use less application time.

By providing a visual display of macrocycle information, the systems and methods disclosed herein may advantageously enable optimal configuration and/or utilization of the field devices. The macrocycle visualization may include timeslots depicting current application time, available application time, execution time, asynchronous communications time, time for publish/subscribe, minimum macrocycle time, and others, as described in more detail below with respect to FIGS. 9 and 10. The timeline visualization may be provided in various ways, such as a bar chart, a pie chart, and/or a line graph, to enable a comprehensive visualization of time allocation. Additionally, the macrocycle may include a re-configurable color legend useful in quickly identifying the various timeslots types found in the macrocycle. Further, a user (e.g., controls engineer, commissioning engineer) may navigate a tree view that includes, multiple linking devices, segments, field devices, and controllers, to easily select items of interest. The macrocycle timeline for each selected item may then be displayed. In this way, the user may more quickly navigate through various items in a control system, select items of interest, and visually inspect the macrocycle timelines for each item. The user may then reprogram and or reconfigure any item to more optimally participate in plant operations.

Turning to FIG. 1, an embodiment of an industrial process control system 10 is depicted. The control system 10 may include a computer system 12 suitable for executing a variety of field device configuration and monitoring applications, and for providing an operator interface through which an engineer or technician may monitor the components of the control system 10. Accordingly, the computer 12 includes a processor 13 that may be used in processing computer instructions, and a memory 15 that may be used to store computer instructions and other data. The computer system 12 may include any type of computing device suitable for running software applications, such as a laptop, a workstation, a tablet computer, or a handheld portable device (e.g., personal digital assistant or cell phone). Indeed, the computer system 12 may include any of a variety of hardware and/or operating system platforms. In accordance with one embodiment, the computer 12 may host an industrial control software, such as a human-machine interface (HMI) software 14, a manufacturing execution system (MES) 16, a distributed control system (DCS) 18, and/or a supervisor control and data acquisition (SCADA) system 20. The HMI 14, MES 16, DCS 18, and/or SCADA 20 may include executable code instructions stored on non-transitory tangible computer readable media, such as the memory 15 of the computer 12. For example, the computer 12 may host the ControlST™ software, available from General Electric Co., of Schenectady, N.Y.

Further, the computer system 12 is communicatively connected to a plant data highway 22 suitable for enabling communication between the depicted computer 12 and other computers 12 in the plant. Indeed, the industrial control system 10 may include multiple computer systems 12 interconnected through the plant data highway 22. The computer system 12 may be further communicatively connected to a unit data highway 24, suitable for communicatively coupling the computer system 12 to an industrial controller 26. The industrial controller 26 may include a processor 27 suitable for executing computer instructions or control logic useful in automating a variety of plant equipment, such as a turbine system 28, a valve 30, a pump 32 and a temperature sensor 34. The industrial controller 26 may further include a memory 35 for use in storing, for example, computer instructions and other data. The industrial controller 26 may communicate with a variety of field devices, including but not limited to flow meters, pH sensors, temperature sensors, vibration sensors, clearance sensors (e.g., measuring distances between a rotating component and a stationary component), pressure sensors, pumps, actuators, valves, and the like. In some embodiments, the industrial controller 26 may be a Mark VIe controller system, available from General Electric Co., of Schenectady, N.Y.

In the depicted embodiment, the turbine system 28, the valve 30, the pump 32, and the temperature sensor 34 are communicatively connected to the industrial controller 26 by using linking devices 36 and 38 suitable for interfacing between an I/O network 40 and an H1 network 42. For example, the linking devices 36 and 38 may include the FG-100 linking device, available from Softing AG, of Haar, Germany. As depicted, the linking devices 36 and 38 may include processors 17 and 19, respectively, useful in executing computer instructions, and may also include memory 21 and 23, useful in storing computer instructions and other data.

In some embodiments, the I/O network 40 may be a 100 Megabit (MB) high speed Ethernet (HSE) network, and the H1 network 42 may be a 31.25 kilobit/second network. Accordingly, data transmitted and received through the I/O network 40 may in turn be transmitted and received by the H1 network 42. That is, the linking devices 36 and 38 may act as bridges between the I/O network 40 and the H1 network 42. For example, higher speed data on the I/O network 40 may be buffered, and then transmitted at suitable speed on the H1 network 42. Accordingly, a variety of field devices may be linked to the industrial controller 26 and to the computer 12. For example, the field devices 28, 30, 32, and 34 may include or may be industrial devices, such as Fieldbus Foundation™ devices that include support for the Foundation H1 bi-directional communications protocol. The field devices may also include support for other communication protocols, such as those found in the HART® Communications Foundation (HCF) protocol, and the Profibus Nutzer Organization e.V. (PNO) protocol.

Each of the linking devices 36 and 38 may include one or more segment ports 44 and 46 useful in segmenting the H1 network 42. For example, the linking device 36 may use the segment port 44 to communicatively couple with the devices 28 and 34, while the linking device 38 may use the segment port 36 to communicatively couple with the devices 30 and 32. Distributing the input/output between the devices 28, 30, 32, and 34, by using, for example, the segment ports 44 and 46, may enable a physical separation useful in maintaining fault tolerance, redundancy, and improving communications time.

Each device 28, 30, 32, and 34 may include one or more function blocks 48, 50, 52, and 54, labeled $FB_1$, $FB_2$, $FB_3$, and $FB_4$, respectively, having computer instructions and/or control logic. Indeed, the field devices 28, 30, 32, and 34 may include or may be "smart" devices capable of encapsulating and executing computer instructions. Accordingly, the field devices 28, 30, 32, and 34, may include respective processors 39, 41, 43, and 45 suitable for executing computer instructions, and memory 47, 49, 51, and 53, suitable for storing computer instructions and other data. Additionally, the controller 26 may also include one or more functions blocks 55 labeled $FB_5$ containing computer instructions or control logic.

Figures 2, 3:
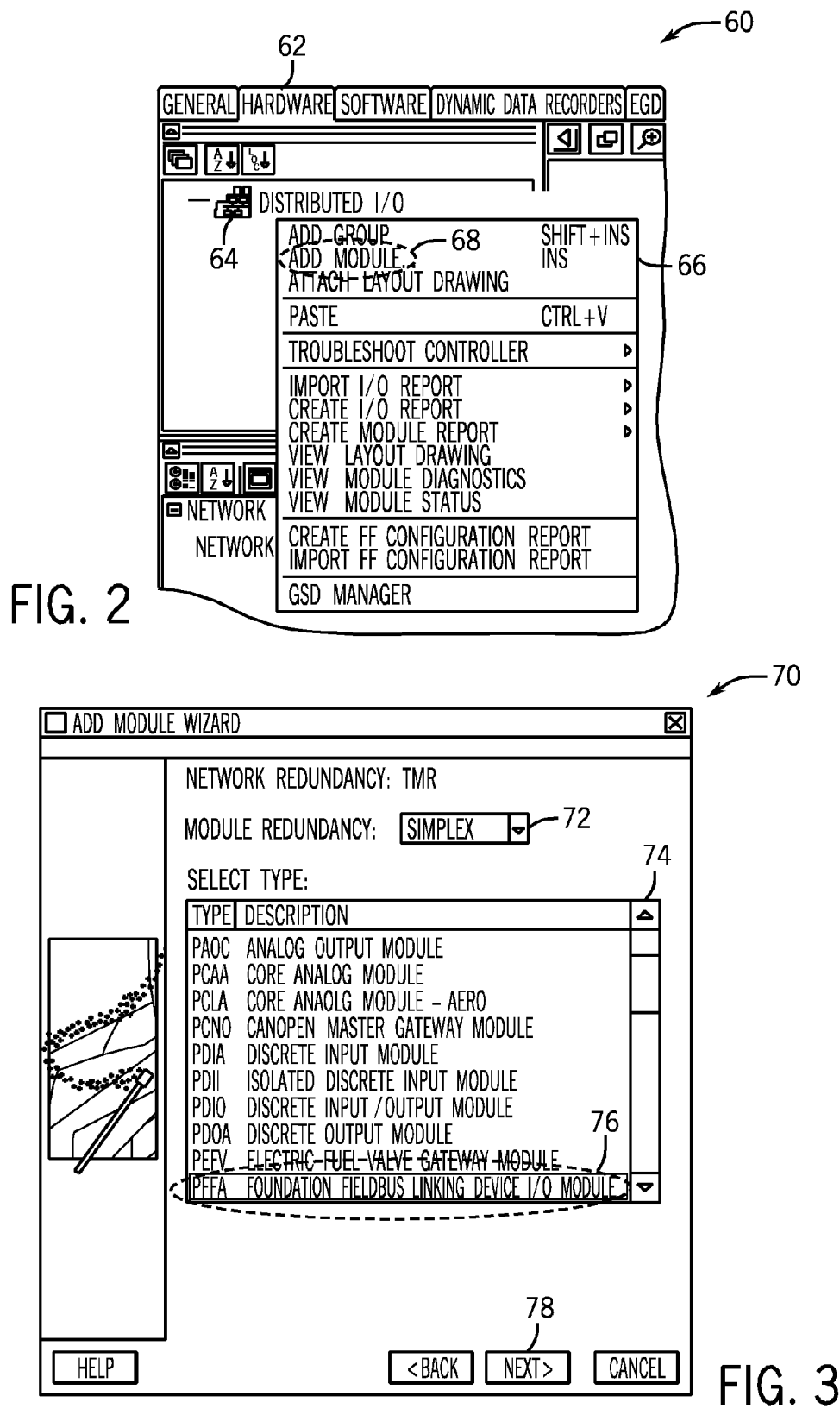
FIG. 2 is a screen view of an embodiment of a hardware tab of software executing on a computer of the industrial control system of FIG. 1.
FIG. 3 is a screen view of an embodiment of a dialog box launched using the hardware tab of FIG. 2.

A LAS 56 may be disposed in the linking devices 36 and 38, and/or the field devices 28, 30, 32, and 34 for scheduling the execution of the computer instructions in the function blocks 48, 50, 52, 54, and 55. For example, the execution of the function blocks 48, 50, 52, 54, and 55 may be scheduled in a macrocycle 58 by the LAS 56. Accordingly, FIG. 2 depicts a screen view that may be included, for example, in the HMI 14, the MES 16, the DCS 18, and/or the SCADA 20, to enable distributed inputs and outputs, including the creation and configuration of the macrocycle 58. In some embodiments, the screen view depicted in FIG. 2 may be implemented as executable code instructions stored on non-transitory, tangible, machine-readable media, such as the computer memory 15 shown in FIG. 1.

More specifically, FIG. 2 is a screen view 60 of an embodiment of a hardware tab 62 presenting distributed I/O options for a component of the industrial process control system 10, such as the controller 26 shown in FIG. 1. For example, the user (e.g., controls engineer, commissioning engineer) may use one of the HMI 14, MES 16, DCS 18, and/or SCADA 20 shown in FIG. 1 to select the controller 26 for distributed I/O commissioning of the linking devices 36 and 38 and/or the field devices 28, 30, 32, and 34. The selection of the controller 26 may result in the presentation of a set of tabs, including the hardware tab 62, which includes various properties associated with the selected controller 26. The user may select the hardware tab 62, and locate a distributed I/O treeview control 64. To add distributed I/O to the controller 26, the user may right click on the distributed I/O treeview control 64 to display a distributed I/O context menu 66. As depicted in FIG. 2, one of the selections of the menu 66 selections may include an Add Module item 68 that enables addition of a module to the controller 26. Adding a module to the controller 26 may enable the creation of one or more types of macrocycles, such as segment macrocycles, cross-segment macrocycles, and cross-linking device macrocycles, as well as their associated field devices, linking devices, and controllers. To add a module, the user may select the Add Module item 68, which in turn may launch or display a dialog box, such as an Add Module dialog box depicted in FIG. 3. In some embodiments, the dialog box depicted in FIG. 3 may be implemented as executable code instructions stored on non-transitory, tangible, machine-readable media, such as the computer memory 15 shown in FIG. 1.

FIG. 3 depicts an embodiment of an Add Module dialog box 70, including a Module Redundancy drop-down box 72 and a Select Type list box 74. The Module Redundancy drop-down box 72 may be used to select a type of desired module redundancy, such as simplex, dual, triple, quadruple, quintuple, or sextuple controller redundancy. For example, the selection of the module redundancy enables a desired number of controllers (e.g., 1, 2, 3, 4, 5, 6) that may be used for fail-over or redundancy purposes. Additionally, the type of module may be selected by using the Select Type list box 74. As depicted in FIG. 3, a variety of module types may be selected, including, but not limited to analog output modules, core analog modules, core analog modules—aero, CANopen master gateway modules, discrete input modules, isolated discrete input module, discrete input/output modules, discrete output modules, electric fuel valve gateway modules, and Fieldbus Foundation™ linking device input/output modules. By enabling a wide selection of module types, the controller 26 may more broadly cover a selection of devices and control logic.

The user may select an item in the Select Type list box 74, such as the Fieldbus Foundation™ Linking Device I/O Module item 76, and then activate the "Next>" button 78 to create the module. It is to be understood that before or after the selection of the module item 76, other dialog boxes may be presented, for example, to capture other controller 26 and/or linking device 36 and 38 information. For example, network port information (e.g., local area network, wide area network, or other information), linking device identification information (e.g., identification data, version data, or other identification information), and the like, may be captured. Once the information is captured and the "Next>" button 78 is activated, a summary dialog box may then present the captured information, as described below with respect to FIG. 4. In some embodiments, the dialog box depicted in FIG. 4 may be implemented as executable code instructions stored on non-transitory, tangible, machine-readable media, such as the computer memory 15 shown in FIG. 1.

Figure 4:
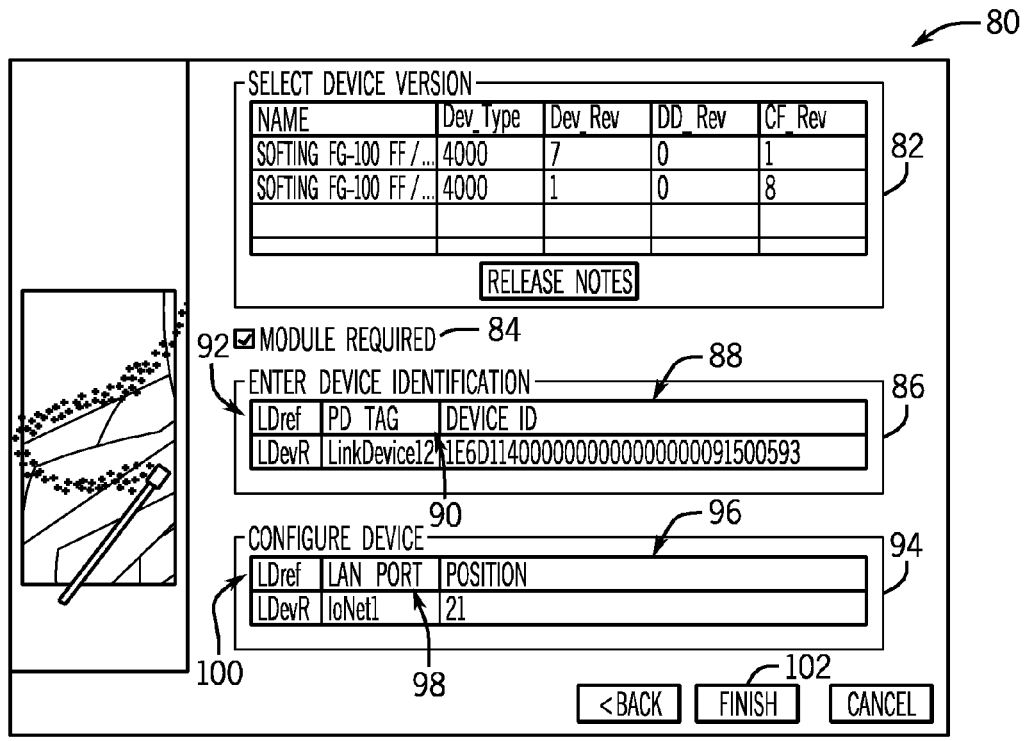
FIG. 4 is a screen view of an embodiment of a summary dialog box.
Figure 5:
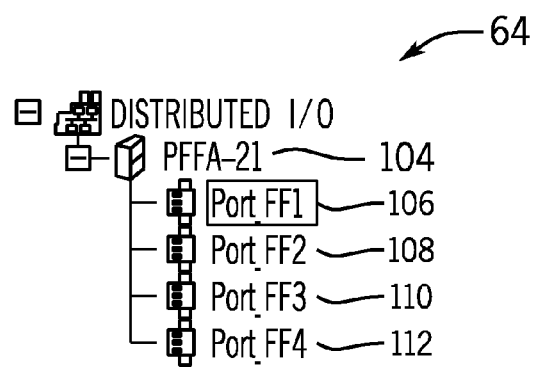
FIG. 5 is a screen view of an embodiment of a treeview control.

FIG. 4 depicts an embodiment of a summary dialog box 80 displaying information captured related to the selection of the module item 76 shown in FIG. 3. As depicted in FIG. 4, the information may include one or more linking device versions 82 associated with the selected module item 76, a checkbox 84 denoting that the module is required, device identification information 86 (e.g., linking device identification 88, tag information 90, and Linking Device Reference 92) that may be used in commissioning the device. The summary dialog box 80 may also depict configuration device data 94 (e.g., position 96, local area network port type 98, and Linking Device Reference 100). Accordingly, the user, such as an engineer, may easily review the displayed information, for example, to verify the proper commissioning parameters for the linking devices 36 and 38 that are to be communicatively connected to the controller 26 shown in FIG. 1. The user may then activate (e.g., click) on a "Finish" button 102 to close the dialog box 80 and add the linking device, as depicted in FIG. 5. In this way, the linking devices 36 and 38 may be commissioned, and the controller 26 suitably configured to interface with the linking devices 36 and 38.

FIG. 5 illustrates an embodiment of the treeview control 64 shown in FIG. 2, including a linking device node 104 labeled "PFFA-21" and created as a root node resulting from the user activities described above with respect to FIGS. 2-4. In some embodiments, the treeview control 64 depicted in FIG. 5 may be implemented as executable code instructions stored on non-transitory, tangible, machine-readable media, such as the computer memory 15 shown in FIG. 1. The linking device node 104 corresponds to one of the linking devices 36, 38, or other linking devices of the system 10. The linking device node 104 includes four ports 106, 108, 110, and 112. Each of the four ports 106, 108, 110, and 112 may be used to attach a segment, such as a segment of the H1 network 42. Accordingly, as shown in FIG. 5, four segments of the H1 network 42 may be attached to the linking device node 104 through the ports 106, 108, 110, and 112. It is to be understood that other linking devices may include more or less segments having more or less ports. It is also to be understood that multiple linking devices may be connected to the controller 26. By enabling multiple H1 segments on each linking device, and multiple field devices on each segment, enhanced redundancy and increased communication capabilities may be provided. To attach a segment to one of the ports 106, 108, 110, and 112, a user may right click on the port and select, for example, an "Attach Segment" option from a context menu. The attached segment may then be displayed as a tree node in the treeview control 64, as described in more detail with respect to FIG. 6.

Figure 6:
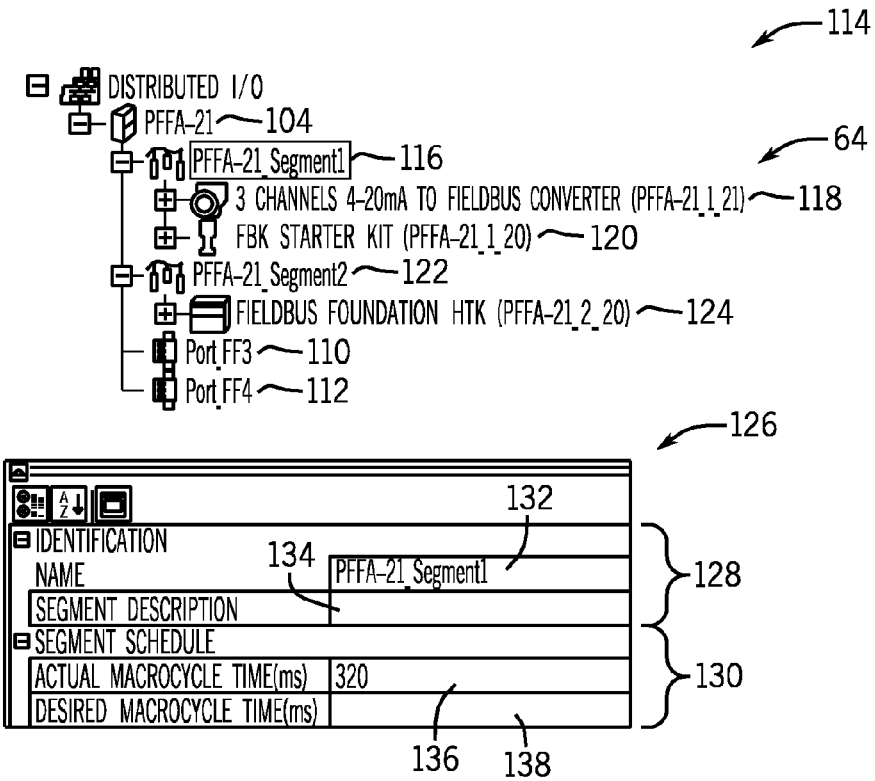
FIG. 6 is a screen view of an embodiment of the treeview control of FIG. 5, including a segment.

FIG. 6 illustrates a screen view 114 of an embodiment of the treeview control 64 shown in FIGS. 2 and 4, having a segment node 116 labeled "PFFA-21_Segment1" and a segment node 122 labeled "PFFA-21_Segment2" attached to the linking device node 104. In some embodiments, the screen view 114 depicted in FIG. 6 may be implemented as executable code instructions stored on non-transitory, tangible, machine-readable media, such as the computer memory 15 shown in FIG. 1. As described above, the segment node 116 may be attached to the linking device node 104 through one of the ports 106, 108, 110, and 112. As depicted, the segment node 116 also has two field device nodes 118 and 120 attached. Indeed, various types of field device nodes may be attached to the segment nodes 116 and 122, such as the attached field device nodes 118, 120, and 124. For example, the nodes 118 and 120 may correspond to the field devices 30 and 32 shown in FIG. 1, while the node 124 may correspond to the field device 34. As also shown in FIG. 6, the ports 110 and 112 remain unattached to any segments nodes (i.e., these ports of the linking device corresponding to linking node 104 are depicted as currently not communicatively coupled to a segment of the H1 network 42).

The depicted embodiment also includes a property sheet 126 with an identification section 128 and a segment schedule section 130. The identification section 128 may include a segment name slot 132 and a segment description slot 134, suitable for storing the selected segment 116 name and any desired selected segment 116 description information. The segment schedule section 130 may includes an Actual Macrocycle Time (ms) slot 136 and a Desired Macrocycle Time (ms) slot 138. The Actual Macrocycle Time (ms) slot 136 may include, for example, a default execution time in milliseconds for the macrocycle 58 shown in FIG. 1. The Desired Macrocycle Time (ms) slot 138 may be used to assign a desired execution time, for example in milliseconds, to the macrocycle 58. Indeed, the user may enter a new desired execution time for the macrocycle 58, based on, for example, the number of field devices used in the H1 network 42, the type of field devices, and/or control logic requirements. As mentioned above, the macrocycle 58 may include control logic or computer instructions having one or more function blocks 48, 50, 52, and 54, such as a control loop depicted in FIG. 7.

Figure 7:
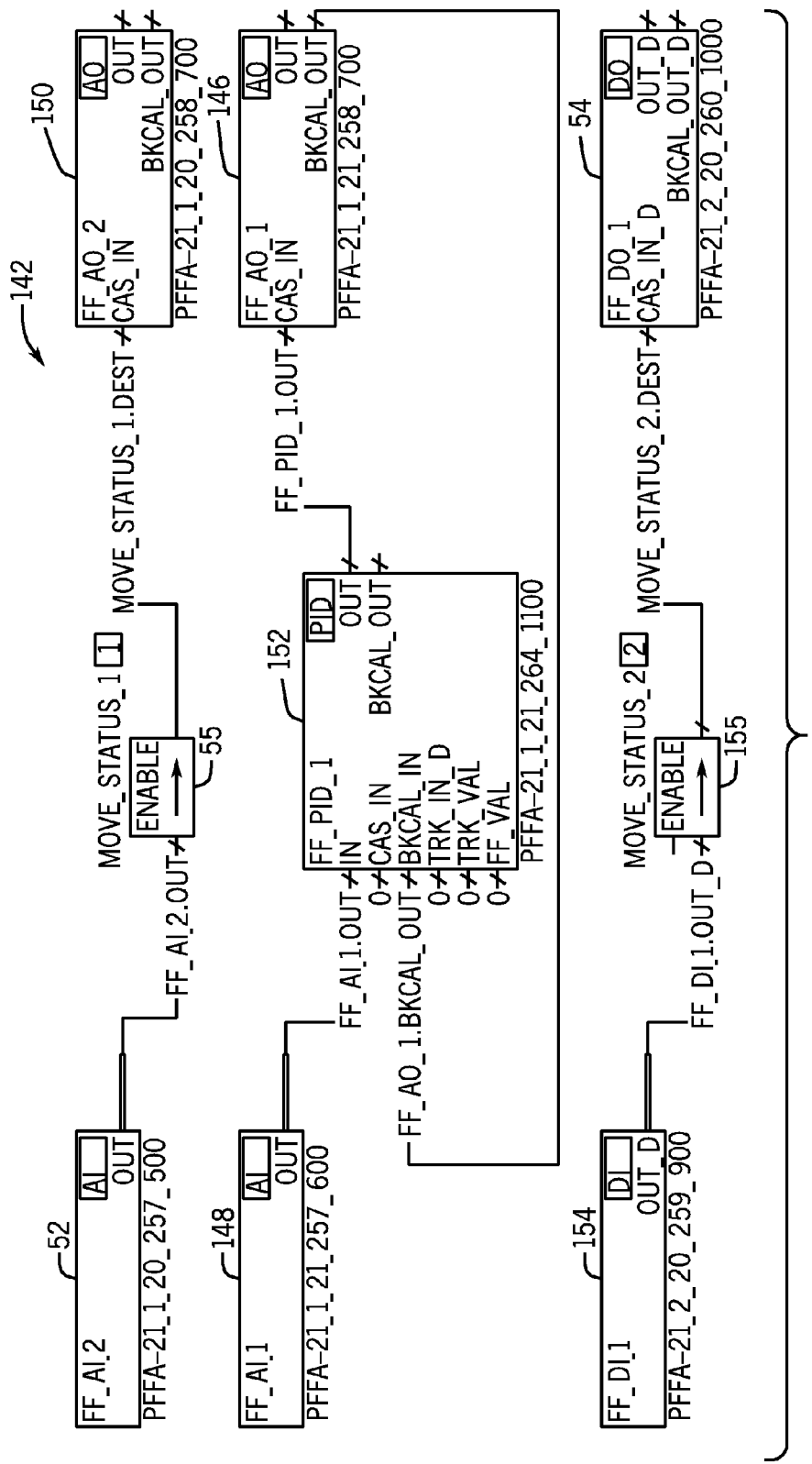
FIG. 7 is a screen view of an embodiment of a control loop.

FIG. 7 depicts a screen view 140 displaying an embodiment of a control loop 142 having the function block 52 labeled "FF_AI_2 PFFA-21_1_1_20_257_500", the function block 54 labeled "FF_DO_1 PFFA-21_2_20_260_1000", the function block 55 labeled "MOVE_STATUS_1", a function block 146 labeled "FF_AO_1 PFFA-21_1_21_258_700", a function block 148 labeled "FF_AI_1 PFFA-21_1_20_257_600", a function block 150 labeled "FF_AO_2 PFFA-21_1_20_258_700", a function block 152 labeled "FF_PID_1 PFFA-21_1_21_264_1100", a function block 154 labeled "FF_DI_1 PFFA-21_2_20_259_900", and a function block 155 labeled "MOVE_STATUS_2." In some embodiments, the screen view 140 depicted in FIG. 7 may be implemented as executable code instructions stored on non-transitory, tangible, machine-readable media, such as the computer memory 15 shown in FIG. 1. As mentioned above, each of the field devices 28, 30, 32, and 34 may include one or more of the function blocks, such as the function blocks 52, 54, 55, 146, 148, 150, 152, 154 and 155. For example, the functions blocks 52 and 54 may be included in the field devices 30 and 32, and shown in FIG. 1. Additionally, the controller 26 may also include one or more of the functions blocks, such as the function block 55 and 155. Indeed, the systems and methods disclosed herein enable the use of function blocks residing in the controller 26, the field devices 28, 30, 32, 34, or a combination thereof. Other function blocks, such as blocks 48 and 50 of field devices 28 and 34, may not be included in the illustrated control loop 142 but may be included in other control loops executed in the macrocycles 58 or other macrocycles.

The function blocks 52, 54, 55, 146, 148, 150, 152, 154, and 155 may include computer instructions or control logic suitable for use in control applications. The user may thus program a control loop, such as the depicted control loop 142, by using the functions blocks 52, 54, 55, 146, 148, 150, 152, 154, and 155. The control loop 142 may then be executed in the macrocycle 58. For example, the LAS 56 shown in FIG. 1 may synchronize the execution of the function blocks 52, 54, 55, 146, 148, 150, 152, 154, and 155 when scheduling the macrocycle 58. Advantageously, the techniques disclosed herein enable a visual presentation of the macrocycle 58 as described in more detail below with respect to FIG. 8. By visualizing the macrocycle 58, the user may more quickly and easily determine application times, communications times, any unused time, and/or current execution time. Indeed, a variety of macrocycle related information may be presented, useful in configuring or programming the various devices 28, 30, 32, 34, 36, and 38. Accordingly, the user may launch a macrocycle timeline viewer, as described in more detail below with respect to FIG. 8.

Figure 8:
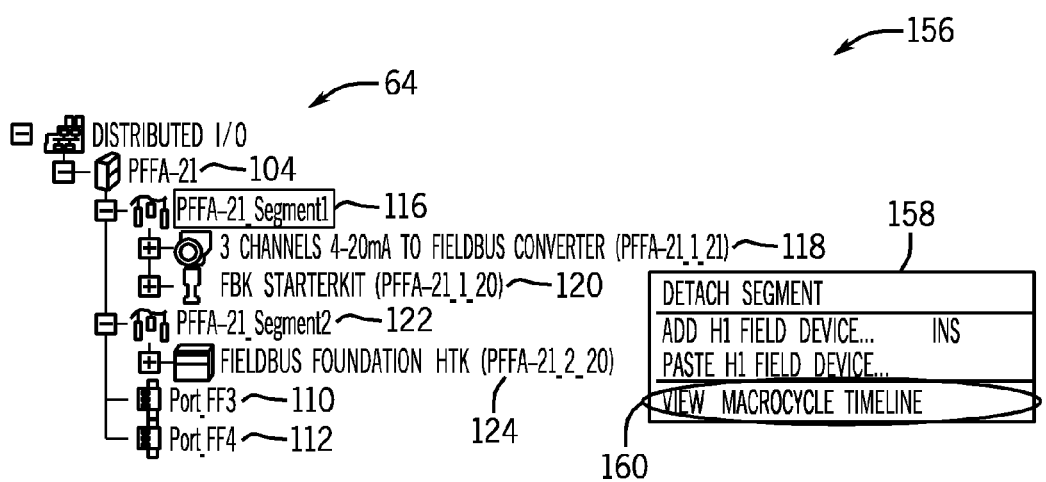
FIG. 8 is a screen view of an embodiment of the treeview control of FIG. 5, including a context menu.

FIG. 8 illustrates a screen view 156 displaying an embodiment of the treeview control 64 shown in FIGS. 2, 5, and 6, and a segment context menu 158. Because the figure contains like elements found in FIGS. 2, 5, and 6, these elements are denoted using like reference numbers. In some embodiments, the screen view 156 depicted in FIG. 8 may be implemented as executable code instructions stored on non-transitory, tangible, machine-readable media, such as the computer memory 15 shown in FIG. 1. The screen view 156 of FIG. 8 is illustrative of the user selecting, such as by right-clicking, the segment node 116, which may result in the display of the segment context menu 158. One of the items in the menu 158 is a View Macrocycle Timeline item 160 that may be selected to launch a macrocycle timeline viewer. For example, a user may right-click on the segment node 116, view the segment context menu 158, and launch the macrocycle timeline viewer depicted in FIG. 9.

Figure 9:
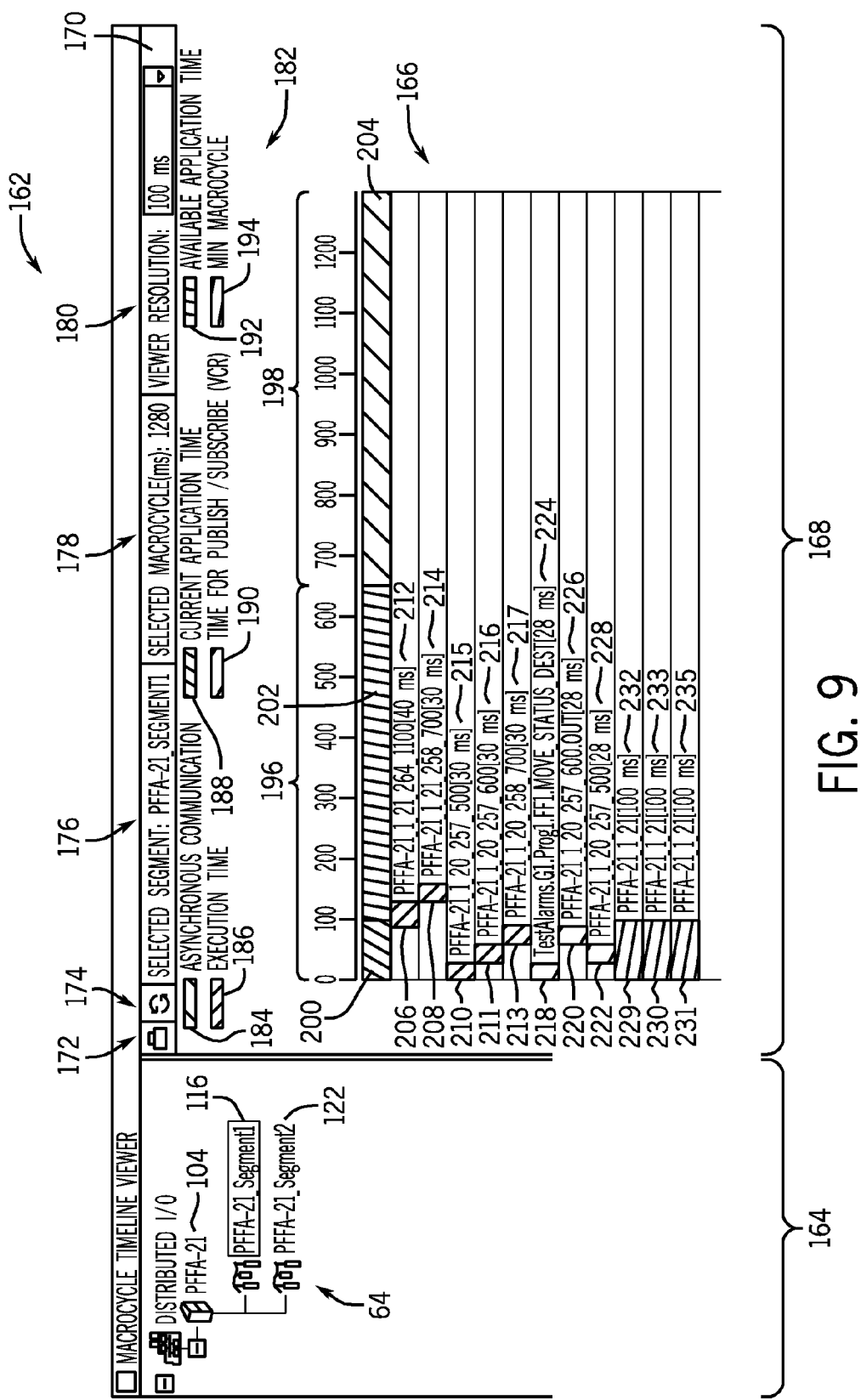
FIG. 9 is a screen view of an embodiment of a macrocycle viewer having a bar chart view.

FIG. 9 illustrates an embodiment of a macrocycle timeline viewer 162. In some embodiments, the macrocycle timeline viewer depicted in FIG. 9 may be implemented as executable code instructions stored on non-transitory, tangible, machine-readable media, such as the computer memory 15 shown in FIG. 1. In the depicted embodiment, the treeview control 64 shown in FIGS. 2, 5, 6, and 8 is presented on a left portion 164 of the macrocycle timeline viewer 162, while a visual macrocycle 166 (i.e., visual representation of the macrocycle 58 shown in FIG. 1) is presented on a right portion 168 of the macrocycle timeline viewer 162. The macrocycle timeline viewer 162 also includes a top ribbon bar 170 for enabling user interaction. For example, a print icon 172 may be used to print a copy of the visual macrocycle 166, while the refresh button 174 may be used to re-display the visual macrocycle 166. Likewise, a Selected Segment slot 176 may display the currently selected segment (e.g., PFFA-21_Segment1), while a Selected Macrocycle (ms) slot 178 may display a total macrocycle time using a unit of time, such as, milliseconds (e.g., 1280 ms). A viewer resolution dropdown box 180 may be used to select a desired time division or resolution of the visual macrocycle 166, e.g., 100 ms resolution. The macrocycle timeline viewer 162 may further include a color legend 182 suitable for depicting colors 184, 186, 188, 190, 192, 194 associated with various bars of the visual macrocycle 166. In this way, the macrocycle 166 may be more easily displayed.

In the depicted embodiment, the visual macrocycle 166 is divided into two sections: an applications section 196 and an asynchronous communications section 198. The applications section 196 may be used to execute scheduled control logic or computer instructions, such as the control loop 142 shown in FIG. 7. The application section 196 may also be used to execute scheduled communications, such as a scheduled device broadcast issued by the LAS 56. For example, during scheduled broadcasts, the LAS 56 may issue a compel data (CD) message to each field device 28, 30, 32, and 34 shown in FIG. 1. Upon receipt of the CD message, each field device 28, 30, 32, and 34 may then broadcast or "publish" data, which may then be received by "subscribers." This type of "publish" and "subscribe" relationship may be defined as a virtual communications relationship (VCR). In turn, the asynchronous communications section 198 may be used to execute certain unscheduled computer instructions or control logic. For example, the unscheduled computer instructions or control logic may include logic useful in detecting new devices that may have joined the H1 network 42 (e.g., plug-and-play detection), as well as unscheduled communications initiated by each field device 28, 30, 32, and 34 (e.g., raising an alarm, sending trend data, sending event information, or the like). In certain embodiment, the asynchronous communications section 198 takes up between 20%-60% of the macrocycle. In the depicted embodiment, the asynchronous communications section 198 is shown as taking up approximately 50% of the macrocycle.

By visually presenting the macrocycle 166 as a timeline, the user may more easily and quickly view execution times, any unused times, and communications times, and make informed decisions regarding re-configuration and programming of the devices 28, 30, 32, 34, 36, and 38, and/or controller 26. For example, a color, such as red 188, may be used to depict a current application timeslot 200, a color, such as green 192, may be used to depict an available application timeslot 202, and a color, such as blue 184, may be used to depict an asynchronous communications timeslot 204. The current application timeslot 200 may denote time used to execute the computer instructions or control logic, such as those included in the function blocks 52, 55, 146, 148, 150, and 152 shown in FIG. 7. Accordingly, a color such as brown 186, may be used to depict function block timeslots 206, 208, and 210, 211, and 213. Additionally, textual labels, 212, 214, 215, 216, and 217 may be used to present, for example, identification information and time. For example, textual label 212 labels the function block 206 with the text "PFFA-21_1_21_264_1100[40 ms]" where the "40 ms" portion is used to denote an execution time of approximately 40 milliseconds for the function block 206. Likewise, the textual label 214 labels the function block 208 with the text "PFFA-21_1_21_258_700[30 ms]" where the "30 ms" portion is used to denote an execution time of approximately 30 milliseconds for the function block 208. Similarly, the textual label 215 labels the function block 210 with the text "PFFA-21_1_20_257_500[30 ms]" where the "30 ms" portion is used to denote an execution time of approximately 30 milliseconds for the function block 210. In a similar manner, the textual label 216 labels the function block 211 with the text "PFFA-21_1_20_257_600[30 ms]" where the "30 ms" portion is used to denote an execution time of approximately 30 milliseconds for the function block 211. The textual label 217 labels the function block 213 with the text "PFFA-21_1_20_258_700[30 ms]" where the "30 ms" portion is used to denote an execution time of approximately 30 milliseconds for the function block 213.

The function block timeslots 206, 208, 210, 211, and 213 correspond to the function blocks 152, 146, 52, 148, and 150, respectively. Therefore, the length of the timeslots 206, 208, 210, 211, and 213 may be derived based on the execution times for their corresponding function blocks 152, 146, 52, 148, and 150. Lengthier execution times may be displayed as longer bars relative to blocks having shorter execution times. In this way, the user can visually determine the execution time of each function block, such as the function blocks 152, 146, 52, 148, and 150. Further, scheduled communication times, such as VCR times associated with the macrocycle 58, can be visualized by using a color, such as purple 190, to depict scheduled communication timeslots 218, 220, and 222. Likewise, text labels 224, 226, and 228 may be used to present information related to the scheduled timeslots 218, 220, and 222, such as descriptions and execution times. For example, the text label 224 may be used to describe the scheduled timeslot 218 with the text "TestAlarms.G1.Prog1.FF1.MOVE_STATUS_1.DEST[28 ms]" where the portion "28 ms" may be used to denote an approximate execution time of 28 milliseconds for the timeslot 218. Likewise, the text label 226 may be used to describe the scheduled timeslot 220 with the text "PFFA-21_1_20_257_600.OUT[28 ms]" where the portion "28 ms" may be used to denote an approximate execution time of 28 milliseconds for the timeslot 220. Similarly, the text label 228 may be used to describe the scheduled timeslot 222 with the text "PFFA-21__1__20__257__500.OUT[28 ms]" where the portion "28 ms" may be used to denote an approximate execution time of 28 milliseconds for the timeslot 222.

Additionally, the macrocycle timeline viewer 162 may include minimum macrocycle execution timeslots 229, 230, and 231 depicted in a color, such as light brown 194. Each of the macrocycles 229, 230, and 231 may be associated with field devices attached to the segment 116. That is, each macrocycle 229, 230, and 231 corresponds to a minimum macrocycle time for a different field device attached to the segment 116. A text label 232 may be used to present information related to the minimum macrocycle execution timeslot 229. For example, the text label 232 may include the text "PFFA-21__1__21[100 ms]" where the "100 ms" portion denotes a minimum execution time of approximately 100 milliseconds. Likewise, a text label 233 may be used to present information related to the minimum macrocycle execution timeslot 230. For example, the text label 233 may include the text "PFFA-21__1__23[100 ms]" where the "100 ms" portion denotes a minimum execution time of approximately 100 milliseconds. Similarly, a text label 235 may be used to present information related to the minimum macrocycle execution timeslot 231. For example, the text label 235 may include the text "PFFA-21__1__20[100 ms]" where the "100 ms" portion denotes a minimum execution time of approximately 100 milliseconds.

More specifically, the macrocycle viewer 162 may calculate the approximate minimum execution time for a type of macrocycle (e.g., segment macrocycle, cross-segment macrocycle, cross-linking device macrocycle), such as the macrocycle 58, and advantageously display the minimum execution time. By calculating the minimum execution time for a macrocycle, the macrocycle timeline viewer 162 may provide a facility for the user to easily and efficiently check for execution times in a process, such as a control process, and reconfigure or reprogram as needed. Indeed, the user may now save time that would have otherwise gone to manually computing macrocycle execution times, which may be inefficient, particularly in control process that include more than a few function blocks.

As depicted, the minimum macrocycle execution timeslot 230 depicts the approximately minimum amount of time that is required to execute scheduled computer instructions or control logic in the visual macrocycle 166 (and representative macrocycle 58), including the function blocks timeslots 206, 208, and 210, and the scheduled communications timeslots 218, 220, and 222. By providing for the visual minimum macrocycle execution timeslot 230, the macrocycle timeline viewer 162 may enable the user to more efficiently employ the macrocycle 58. For example, the user may notice that the minimum macrocycle execution timeslot 230 is below a certain time (e.g., 120 ms). Accordingly, the user may reduce the overall time of the macrocycle 58 to provide time for other segments and linking devices. Similarly, the user may notice that the minimum macrocycle execution timeslot 230 takes over a substantial portion of the application section 196, or that the available application timeslot 202 is small. The user may then increase the overall time of the macrocycle 58 to provide for more execution time in the current segment 116.

It is to be noted that the macrocycle timeline viewer 162 may be used to view and/or print macrocycles at various levels. For example, in one embodiment, the macrocycle timeline viewer 162 may be used to depict a macrocycle at the segment level. That is, time associated with field devices attached to a given segment may be used to provide a segment macrocycle. In another embodiment, a cross-segment macrocycle may be viewed, where the macrocycle includes times associated with one or more segments, such as all the segments attached to a linking device. Indeed, the cross-segment macrocycle may include function blocks from more than one segment. In yet another embodiment, a cross-linking device macrocycle may be displayed. In this embodiment, the macrocycle viewer 162 may display time associated with field devices attached to a plurality of linking devices. By providing for the visual display and/or printing of various types of macrocycles, the macrocycle viewer 162 may enable a more comprehensive visual display of time at a variety of levels, including a segment, across segments, and across linking devices. It is to be understood that the macrocycle timeline viewer 162 may print at various formats including but not limited to postscript, portable document format (PDF), scalable vector graphics (SVG), bitmap (BMP), joint photographic experts group (JPEG), and/or portable network graphics (PNG).

Figure 10:
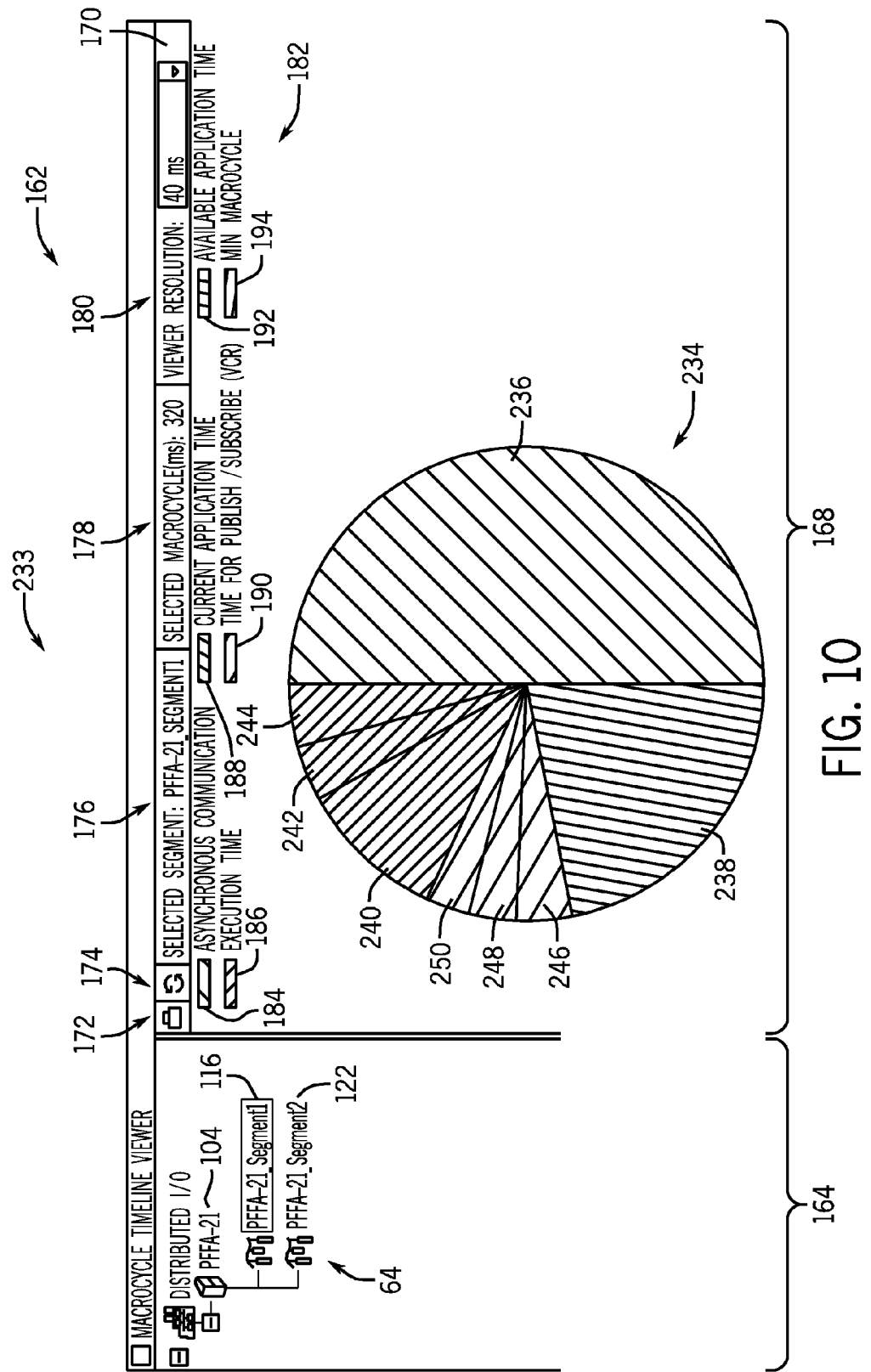
FIG. 10 is a screen view of an embodiment of a macrocycle viewer having a pie chart view.

Additionally, the macrocycle viewer 162 may provide for other visual representations, such as a bar chart described in more detail with respect to FIG. 10. More specifically, FIG. 10 is a screen view 233 presenting an embodiment of a pie chart 234 representing the visual macrocycle 166 shown in FIG. 9. In some embodiments, the screen view 233 depicted in FIG. 10 may be implemented as executable code instructions stored on non-transitory, tangible, machine-readable media, such as the computer memory 15 shown in FIG. 1. Because the figure contains like elements found in FIG. 9, these elements are denoted using like reference numbers. In the depicted embodiment, a segment 236 may be used to depict the asynchronous communications time in the color blue 184, while a segment 238 may be used to depict the available application time in the color green 192. Likewise, segments 240, 242, and 244 may be used to depict execution time associated with the function blocks 52, 148, and 146 shown in FIG. 7. Similarly, segments 246, 248, and 250 may be used to display scheduled communications time (e.g., VCR time). By presenting the macrocycle 58 in other visual formats, such as a bar chart 234 format, various types of macrocycle visualizations may be provided, as desired. The user may select the desired visualization and receive visual macrocycle information in the preferred visual format. Other visualizations may also include line charts, where lines may be used to visualize the asynchronous communication, current application time, available application time, execution time, scheduled communication time, and/or minimum macrocycle execution time. Indeed, the macrocycle 58 may be provided in a variety of visualization useful to quickly and easily configure and/or program the devices associated with the macrocycle 58.

Technical effects of the invention include a visual depiction of a variety of macrocycles for devices of an industrial process control system, such as segment macrocycles, cross-segment macrocycles and cross-linking device macrocycles. The macrocycle may be depicted using a timeline viewer suitable for visually presenting a variety of information, including a minimum macrocycle execution time, function block execution time, scheduled communication time, and unscheduled communication time. The macrocycle viewer may present the information in a number of visual formats, including a bar chart, a pie chart, and a line chart.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An industrial process control system comprising:
a processor;
a link active scheduler configured to schedule execution of a macrocycle comprising an application timeslot and an asynchronous timeslot, wherein the link active scheduler is further configured to schedule execution of scheduled instructions for a plurality of field devices of the industrial process control system in the application timeslot, and the link active scheduler is further configured to schedule execution of unscheduled instructions for the plurality of field devices of the industrial process control system in the asynchronous timeslot; and
a macrocycle viewer executable by the processor, wherein the macrocycle viewer is configured to display the macrocycle in a visual format, wherein the visual format comprises a first visual depiction of the application timeslot and second visual depiction of the asynchronous timeslot, wherein the first visual depiction visually aggregates all of the scheduled instructions and the second visual depiction visually aggregates all of the unscheduled instructions.

2. The system of claim 1, comprising a controller, wherein the link active scheduler is further configured to schedule instructions for the controller, the plurality of field devices of the industrial process control system, or a combination thereof, in the application timeslot.

3. The system of claim 1, wherein the application timeslot comprises a current application timeslot, an available application timeslot, a scheduled communications timeslot, or a combination thereof.

4. The system of claim 3, wherein the scheduled communication timeslot comprises a virtual communications relationship (VCR) timeslot.

5. The system of claim 3, wherein the scheduled instructions comprise a function block, and the link active scheduler is further configured to schedule execution of the function block in the current application timeslot.

6. The system of claim 5, wherein the function block comprises a field device function block, a controller function block, or a combination thereof.

7. The system of claim 1, wherein the macrocycle comprises a segment macrocycle, a cross-segment macrocycle, a linking device macrocycle, or a combination thereof.

8. The system of claim 1, wherein the macrocycle viewer is further configured to visually display a minimum macrocycle execution timeslot based on a minimum amount of time used to execute the scheduled instructions in the macrocycle.

9. The system of claim 4, wherein the visual format comprises a pie chart, or a line chart.

10. The system of claim 1, comprising a linking device having the link active scheduler.

11. The system of claim 1, comprising a linking device, a high speed Ethernet network, and a Foundation H1 network, wherein the linking device is configured to link the high speed Ethernet network to the Foundation H1 network, and the plurality of field devices are attached to the Foundation H1 network.

12. The system of claim 11, wherein one of the plurality of field devices comprises the link active scheduler, or the linking device comprises the link active scheduler, or a combination thereof.

13. The system of claim 1, wherein the visual format comprises a bar chart, wherein the asynchronous timeslot comprises a bar having a length representative of execution times for the unscheduled instructions.

14. A method comprising:
providing, by a processor of a computer, a visual representation of a macrocycle of an industrial process control system, wherein the macrocycle comprises an application timeslot and an asynchronous timeslot, and wherein a link active scheduler is configured to schedule execution of at least one function block during the application timeslot, and to schedule execution of unscheduled instructions in the asynchronous timeslot;
displaying the visual representation on a display of the computer, wherein the visual representation comprises a first visual depiction of the application timeslot and second visual depiction of the asynchronous timeslot, wherein the first visual depiction visually aggregates all of the scheduled instructions and the second visual depiction visually aggregates all of the unscheduled instructions.

15. The method of claim 14, wherein the function block comprises a Fieldbus Foundation function block, a Profibus function block, a HART function block, or a combination thereof, and wherein the function block is included in a field device or in a controller.

16. The method of claim 14, wherein the macrocycle comprises a segment macrocycle, a cross-segment macrocycle, a linking device macrocycle, or a combination thereof.

17. The method of claim 14, wherein providing the visual representation comprises providing a bar chart, a pie chart, a line chart, or a combination thereof.

18. A non-transitory tangible computer-readable medium comprising executable code, the code comprising instructions for:
displaying a process control system macrocycle in a visual format, wherein the process control system macrocycle comprises an application timeslot and an asynchronous timeslot, wherein scheduled instructions are configured to execute during the application timeslot and unscheduled instructions are configured to execute during the asynchronous timeslot, and wherein the visual format comprises a first visual depiction of the application timeslot and second visual depiction of the asynchronous timeslot, wherein the first visual depiction visually aggregates all of the scheduled instructions and the second visual depiction visually aggregates all of the unscheduled instructions.

19. The non-transitory tangible computer-readable medium of claim 18, wherein displaying the process control macrocycle in the visual format comprises displaying a bar chart representation of the process control macrocycle, a pie chart representation of the process control macrocycle, a line chart representation of the process control macrocycle, or a combination thereof.

20. The non-transitory tangible computer-readable medium of claim 18, wherein the process control system macrocycle comprises a segment macrocycle, a cross-segment macrocycle, a cross-linking device macrocycle, or a combination thereof.

21. The non-transitory tangible computer-readable medium of claim 18, wherein the scheduled instructions comprise a function block associated with a field device or with a controller, and wherein the field device comprises a Fieldbus Foundation field device, a Profibus field device, or a HART field device.

* * * * *